(12) United States Patent
Fan et al.

(10) Patent No.: US 11,709,755 B2
(45) Date of Patent: Jul. 25, 2023

(54) METHOD, DEVICE, AND PROGRAM PRODUCT FOR MANAGING STORAGE POOL OF STORAGE SYSTEM

(71) Applicant: EMC IP Holding Company LLC, Hopkinton, MA (US)

(72) Inventors: Huijuan Fan, Chengdu (CN); Chi Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 17/201,521

(22) Filed: Mar. 15, 2021

(65) Prior Publication Data
US 2022/0164274 A1 May 26, 2022

(30) Foreign Application Priority Data
Nov. 20, 2020 (CN) .......................... 202011308120.X

(51) Int. Cl.
*G06F 11/34* (2006.01)
*G06F 3/06* (2006.01)
*G06F 11/30* (2006.01)

(52) U.S. Cl.
CPC ........ *G06F 11/3442* (2013.01); *G06F 3/0619* (2013.01); *G06F 3/0644* (2013.01); *G06F 3/0647* (2013.01); *G06F 3/0689* (2013.01); *G06F 11/3037* (2013.01); *G06F 11/3433* (2013.01)

(58) Field of Classification Search
CPC .. G06F 11/3442; G06F 3/0619; G06F 3/0644; G06F 3/0647; G06F 3/0689; G06F 11/3037; G06F 11/3433
See application file for complete search history.

(56) References Cited

U.S. PATENT DOCUMENTS

| | | | |
|---|---|---|---|
| 8,566,553 B1 | 10/2013 | Marshak et al. | |
| 9,459,809 B1 | 10/2016 | Chen et al. | |
| 10,126,988 B1* | 11/2018 | Han | G06F 3/0604 |
| 10,296,252 B1* | 5/2019 | Han | G06F 3/0634 |
| 11,281,536 B2 | 3/2022 | Gao et al. | |
| 2015/0256432 A1* | 9/2015 | Agarwala | G06F 3/067 709/214 |
| 2019/0205053 A1* | 7/2019 | Nomura | G06F 3/0605 |
| 2021/0216230 A1 | 7/2021 | Dalmatov et al. | |

* cited by examiner

*Primary Examiner* — Jason W Blust
(74) *Attorney, Agent, or Firm* — BainwoodHuang

(57) ABSTRACT

Storage devices in a pool are divided into at least one group with a first number of storage devices in an existing group not higher than a range. When a second number of storage devices are added to the resource pool, a sum of the first number and the second number is determined. A new group is created based on at least a portion of the second number of storage devices when the sum does not satisfy the range; and another portion of the second number of storage devices are added to the existing group. A first storage space portion in each of a set of shared storage devices selected from the existing group is allocated to the existing group, and a second storage space portion in each of the set of shared storage devices is allocated to the new group. The storage space utilization rate can be increased.

20 Claims, 9 Drawing Sheets

METHOD, DEVICE, AND PROGRAM PRODUCT FOR MANAGING STORAGE POOL OF STORAGE SYSTEM

CROSS-REFERENCE TO RELATED APPLICATION

This application claims priority to Chinese Patent Application No. CN202011308120.X, on file at the China National Intellectual Property Administration (CNIPA), having a filing date of Nov. 20, 2020, and having "METHOD, DEVICE, AND PROGRAM PRODUCT FOR MANAGING STORAGE POOL OF STORAGE SYSTEM" as a title, the contents and teachings of which are herein incorporated by reference in their entirety.

TECHNICAL FIELD

The implementations of the present disclosure relate to storage management, and more particularly, relate to a method, a device, and a computer program product for managing a storage resource pool (referred to as a resource pool) of a storage system.

BACKGROUND

With the development of data storage technologies, various data storage devices have been able to provide users with increasingly high data storage capacities, and the speed of data access has also been greatly improved. Along with the increase in data storage capacity, users also place increasingly high demands on data reliability and scalability of storage systems. At present, various data storage systems based on Redundant Array of Independent Disks (RAID) have been developed to improve data reliability. When one or more disks in a storage system malfunction, data in the malfunctioning disks can be reconstructed from data on other normally operating disks.

Mapped RAID has been developed at present. In this mapped RAID, disk is a logical concept and may include multiple extents. Multiple extents included in a logical disk can be distributed across different physical storage devices in a resource pool. For a plurality of extents in one stripe of the mapped RAID, the plurality of extents should be distributed on different physical storage devices, so that when a physical storage device where one of the plurality of extents is located fails, a reconstruction operation may be performed to recover data from physical storage devices where other extents are located.

To facilitate the management of multiple storage devices in a resource pool, the multiple storage devices can be divided into at least one group in accordance with a group threshold range (including an upper limit threshold and a lower limit threshold), and a user storage system can be created based on multiple storage devices in each group. Here, the number of storage devices in each group satisfies the group threshold range. During the operation of the storage system, new storage devices can be added to the resource pool. In some cases, the storage devices in the resource pool cannot be divided into groups that satisfy the above threshold range, then at this moment no newly added storage device can be added to the groups. At this moment, how to use the storage space in the newly added storage device as effectively as possible becomes a technical problem.

SUMMARY OF THE INVENTION

Therefore, it is expected to develop and implement a technical solution to manage multiple storage devices in a resource pool in a more efficient manner. It is desirable that the technical solution is compatible with existing storage systems, and by modifying various configurations of existing storage systems, the storage systems may be managed in a more effective manner.

According to a first aspect of the present disclosure, a method for managing a resource pool of a storage system is provided. The resource pool includes multiple storage devices which are divided into at least one group with a first number of storage devices in an existing group of the at least one group not higher than an upper limit threshold of a group threshold range. In this method, according to a determination that a second number of storage devices are added to the resource pool, a sum of the first number and the second number is determined. A new group is created based on at least a portion of the second number of storage devices according to a determination that the sum of the first number and the second number does not satisfy the group threshold range; and another portion of the second number of storage devices are added to the existing group. A first portion of storage space in each of a set of shared storage devices selected from the existing group is allocated to the existing group, and a second portion of storage space in each of the set of shared storage devices is allocated to the new group.

According to a second aspect of the present disclosure, an electronic device is provided. The electronic device includes at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used for performing the method according to the first aspect of the present disclosure.

BRIEF DESCRIPTION OF THE DRAWINGS

The features, advantages, and other aspects of respective implementations of the present disclosure will become more apparent from the following detailed description and in conjunction with the accompanying drawings. Certain implementations of the present disclosure are shown herein by way of example and not limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

In the following, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure can be fully conveyed to those skilled in the art.

As used herein, the term "including" and variations thereof mean open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may also be included below.

In the context of the present disclosure, a storage system may be a RAID-based storage system. The RAID-based storage system may combine multiple storage devices into one disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are a number of RAID standards, for example, RAID-1, RAID-2, RAID-3, RAID-4, RAID-5, RAID-6, RAID-10, RAID-50, and so on.

Figure 1:
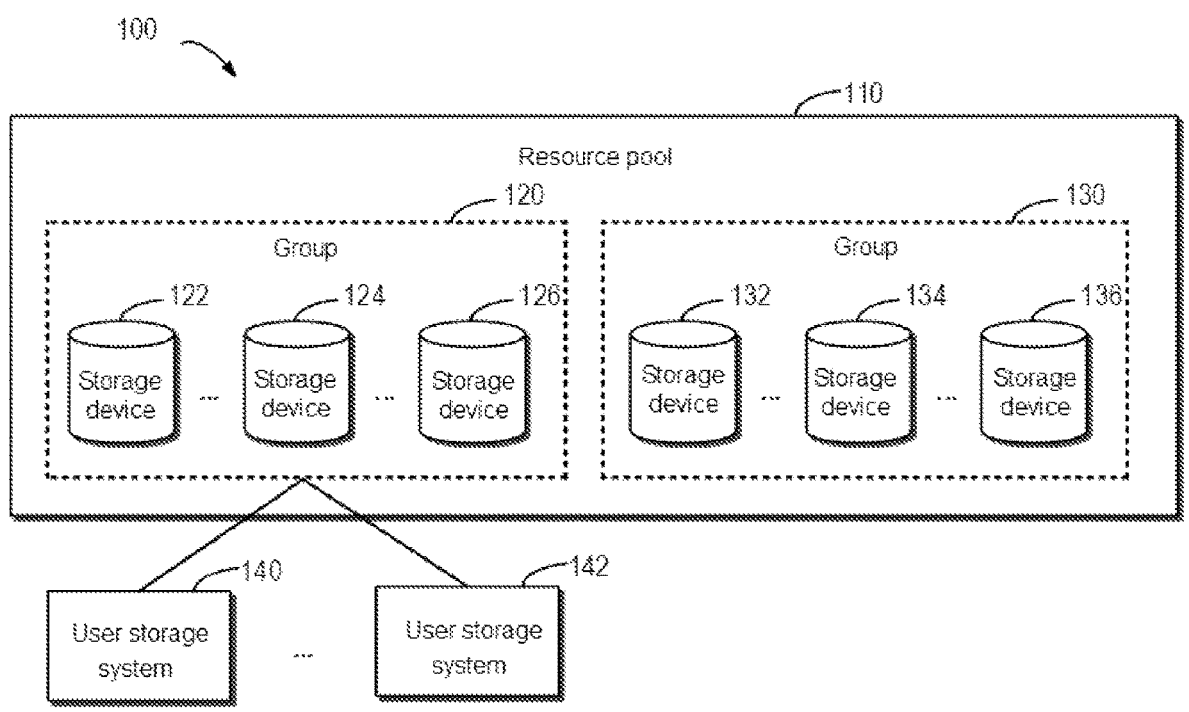
FIG. 1 schematically illustrates a schematic diagram of a storage system in which the implementations of the present disclosure may be implemented.

Firstly, an application environment according to an example implementation of the present disclosure will be described with reference to FIG. 1. FIG. 1 schematically illustrates a schematic diagram of storage system 100 in which the implementations of the present disclosure may be implemented. As shown in FIG. 1, storage system 100 may include resource pool 110 which may include multiple storage devices. To facilitate management, the multiple storage devices can be divided into one or more groups. For example, storage devices 122, . . . , 124, . . . , and 126 may be grouped into group 120, and storage devices 132, . . . , 134, . . . , and 136 may be grouped into group 130. Based on the mapped RAID technology, the storage space in each storage device in one group may be used to create a user storage system. For example, user storage systems 140, . . . , and 142 may be created based on the storage space in group 120, respectively.

Here, a group threshold range can be set for the number of storage devices included in the group. For example, the group threshold range may include an upper limit threshold (denoted as $TH_{high}$) for specifying an upper limit on the number of storage devices in the group; and the group threshold range may include a lower limit threshold (denoted as $TH_{low}$) for specifying a lower limit on the number of storage devices in the group. In general, the upper limit threshold may be set to 64 or some other values; and the lower limit threshold may be determined based on the stripe width of the storage system and the number of backup storage devices required. For example, in a 4D+1P storage system with the stripe width of 4+1=5 and the number of backup storage devices of 1, the lower limit threshold can be determined based on the sum of the two: 5+1=6. At this moment, each group may include from 6 to 64 storage devices. When the number of storage devices included in resource pool 110 exceeds 64, multiple groups may exist.

It will be understood that the number of storage devices in only one group in resource pool 110 is less than (or equal to) the upper limit threshold, while the number of storage devices in one or more other groups should be equal to the upper limit threshold. When adding more new storage devices to the resource pool, the new storage devices are first added to the group (if present) with the number less than the upper limit threshold, so as to reach the upper limit threshold. If there are still more new storage devices, a new group is created. Based on the above description, it can be seen that the resource pool may accommodate 6 to 64 storage devices when it includes 1 group, 72 to 128 storage devices when it includes 2 groups, and (N−1)*64+6 to N*64 storage devices when it includes N groups.

It will be understood that the above ranges are not continuous, which results in the possibility of under-utilizing new storage devices when adding them to resource pool 110. For example, assuming that the resource pool includes 1 group, and this group includes 62 storage devices. When 5 storage devices are added to the resource pool, 4 of the 5 storage devices can be added to the existing group, and the other 5−4=1 storage device is used to create a new group. Since the number of storage devices in the new group is 1 (1<6) and does not satisfy the lower limit threshold, the storage space of the 1 storage device in the new group cannot be utilized at this moment. Therefore, it is expected to provide a more effective way to manage the storage devices in the resource pool to make use of the storage space in all the storage devices as fully as possible.

Figure 2:
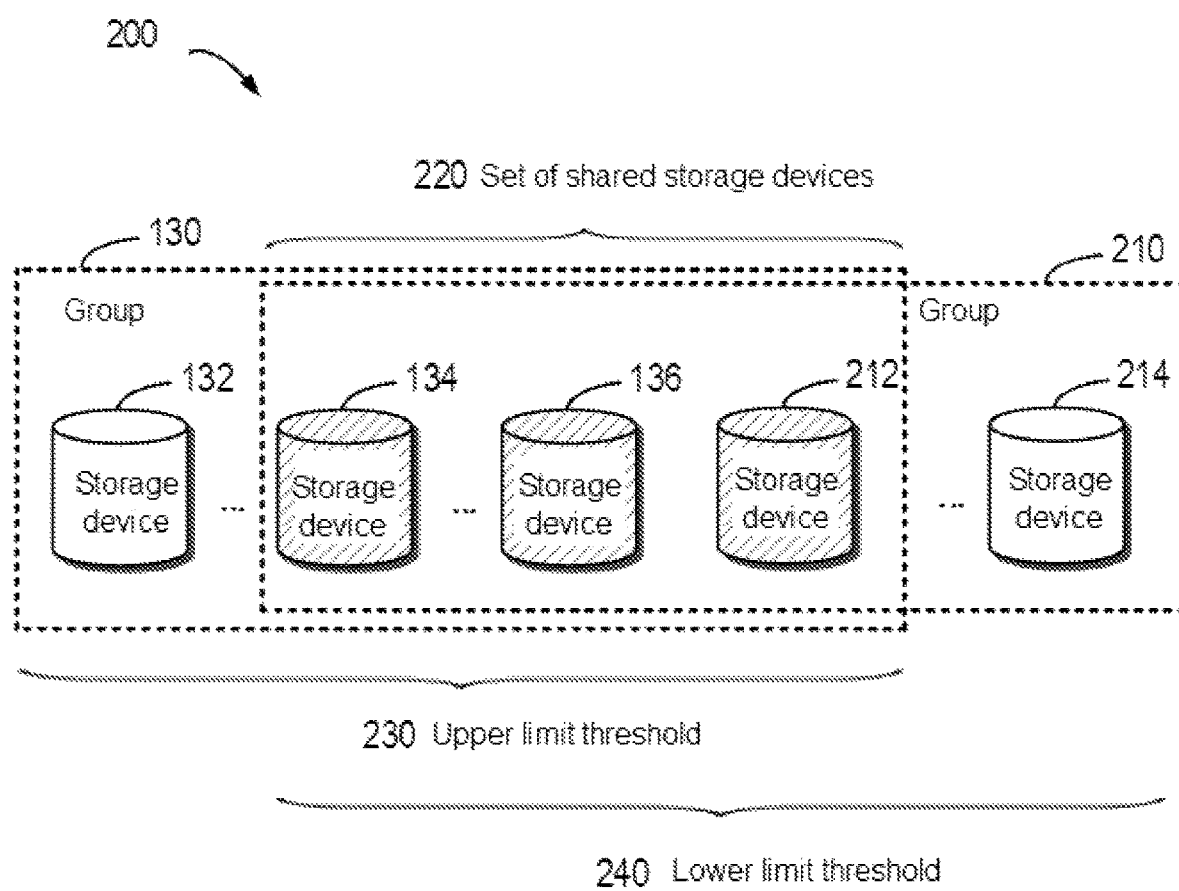
FIG. 2 schematically illustrates a block diagram of a process for managing a resource pool of a storage system according to an implementation of the present disclosure.

In order to at least partially address the deficiencies in the above technical solution, a technical solution for managing a resource pool of a storage system is provided according to example implementations of the present disclosure. Hereinafter, a process according to an example implementation of the present disclosure will be described in general with reference to FIG. 2. FIG. 2 schematically illustrates a block diagram of process 200 for managing a resource pool of a storage system according to an implementation of the present disclosure. According to an example implementation of the present disclosure, a concept of "shared storage device" is proposed, wherein the shared storage device represents a storage device that is shared between two groups. There may be one or more shared storage devices, and the storage space of each shared storage device may be divided into two portions with one portion used for an existing group and the other portion used for a new group.

As shown in FIG. 2, assuming that group 130 includes 63 storage devices 132, ..., 134, and 136, and that 4 storage devices 212 to 214 are added to the resource pool to form groups 130 and 210, then a set of shared storage devices 220 (including storage devices 134, ..., and 136) can be determined. Specifically, new group 210 may be created based on 3 storage devices 212 to 214, and a portion (e.g., 50%) of storage space of 3 storage devices 134, ..., and 136 in existing group 130 is borrowed. At this moment, group 130 includes all of the storage space in storage device 132, etc., and 50% of the storage space in storage devices 134, ..., 136, and 212, and new group 210 includes the other 50% of the storage space in storage devices 134, ..., 136, and 212 and all of the storage space in storage device 214, etc. At this moment, the number of storage devices in group 130 satisfies upper limit threshold 230, and the number of storage devices in group 210 satisfies lower limit threshold 240.

With the example implementation of the present disclosure, although the storage space in one shared storage device and used for each group is less than all the storage space, the shared storage device can allow the number of storage devices in each group to satisfy both the upper and lower limit threshold requirements, thereby making full use of the storage devices in the newly added storage devices. It will be understood that FIG. 2 above only schematically illustrates an example of a set of shared storage devices 220. Depending on the number of storage devices in the existing group and the number of the newly added storage devices, there will be different scenarios. This will be described in detail below.

Figure 3:
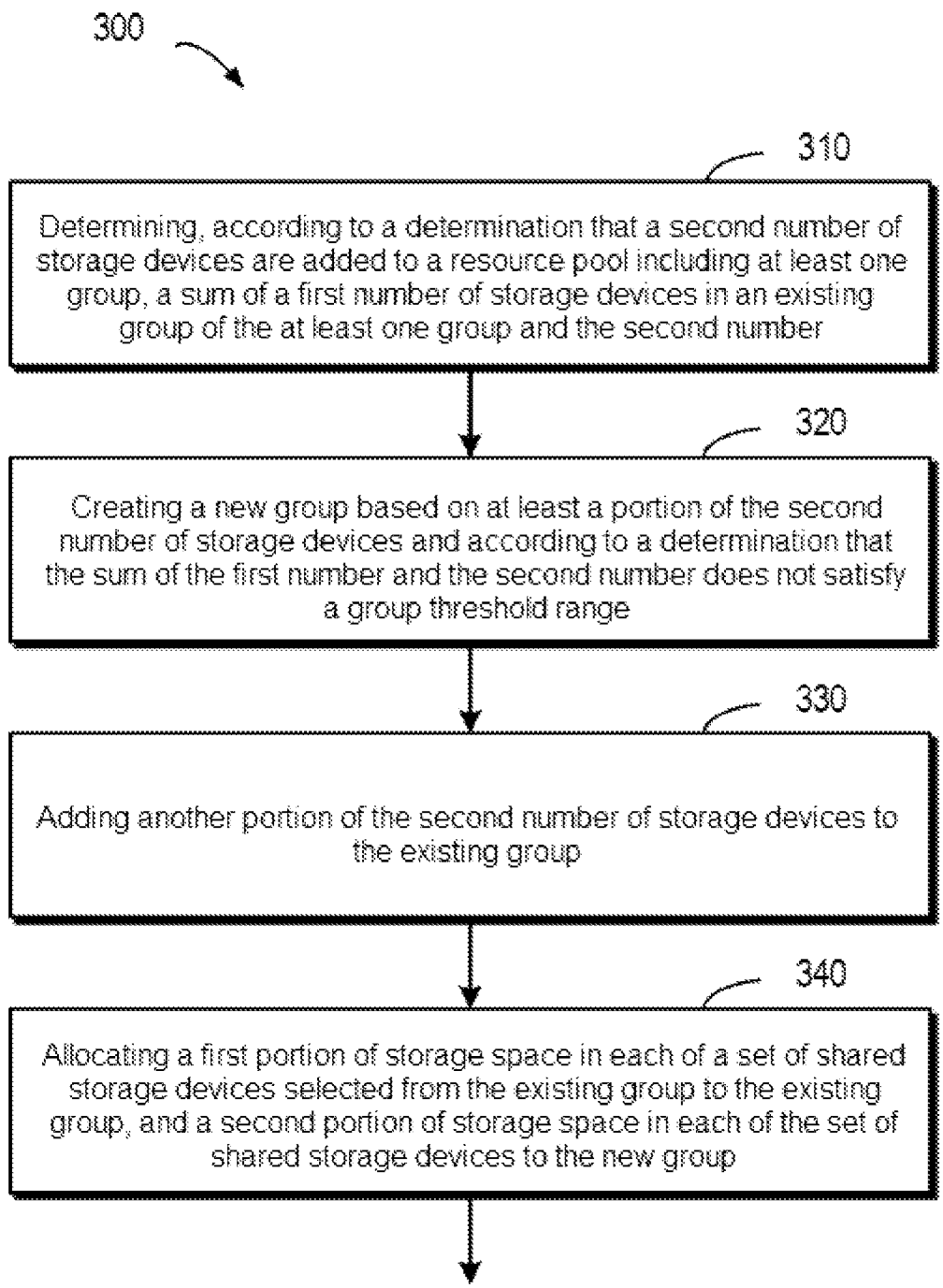
FIG. 3 schematically illustrates a flow chart of a method for managing a resource pool of a storage system according to an implementation of the present disclosure.

FIG. 3 schematically illustrates a flow chart of method 300 for managing a resource pool of a storage system according to an implementation of the present disclosure. Method 300 may be implemented at an electronic device with computing capability in storage system 100. Here, resource pool 110 of storage system 100 includes multiple storage devices which are divided into at least one group. The first number (denoted as $CNT_{old}$) of storage devices in one group (e.g., the last group) of the at least one group is not higher than an upper limit threshold of a group threshold range, and the numbers of storage devices in groups other than that group of the at least one group are equal to the upper limit threshold, respectively. In other words, the groups are divided in accordance with the predetermined upper limit threshold, and at most only the number of storage devices in the last group is less than (or equal to) the upper limit threshold. If the numbers of storage devices in all the groups are equal to the upper limit threshold, any one of the groups can be regarded as the last group.

According to an example implementation of the present disclosure, the last group (referred to as an existing group) in which the number of storage devices included is less than the upper limit threshold can be found first, and one or more storage devices can be added to the existing group. If the number of storage devices in the existing group reaches the upper limit threshold, a new group can be created and one or more shared storage devices can be determined from the existing group. It will be understood that if the numbers of storage devices in all the groups are equal to the upper limit threshold, a new group can be created and one or more shared storage devices can be determined from any of existing groups.

At block 310, according to a determination that a second number (denoted as $CNT_{add}$) of storage devices are added to the resource pool, a sum of the first number $CNT_{old}$ and the second number $CNT_{add}$ is determined. It will be understood that the sum of the first number and the second number represents the number of storage devices that have not yet formed regular groups. If this number satisfies the group threshold range, zero to more storage devices of the second number of storage devices can be directly added to an existing group. If there are remaining storage devices, a new group can be created based on the remaining storage devices. At this moment, the number of storage devices in the new group will be higher than or equal to the lower limit threshold, and thus all storage space in the newly added second number of storage devices can be fully utilized.

At block 320, a new group is created based on at least a portion of the second number of storage devices according to a determination that the sum of the first number and the second number does not satisfy the group threshold range. At block 330, another portion of the second number of storage devices are added to the existing group. For ease of description, the number of storage devices added to the existing group among the second number of storage devices can be denoted as $CNT_{add,old}$ and the number of storage devices added to the new group among the second number of storage devices can be denoted as $CNT_{add,new}$.

According to an example implementation of the present disclosure, when the sum of the first number and the second number does not satisfy the group threshold range, it will result in a situation where it is impossible to fully utilize all the storage space in accordance with conventional technical solutions. At this moment, a new group can be created and a portion of storage space in a set of shared storage devices can be "borrowed" from the existing group. According to an example implementation of the present disclosure, the numbers $CNT_{add,old}$ and $CNT_{add,new}$ of storage devices to be added to the existing group and the new group may first be determined. The number $CNT_{add,old}$ of storage devices to be added to the existing group can be determined based on Formula 1, and the number $CNT_{add,new}$ of storage devices to be added to the new group can be determined based on Formula 2:

$$CNT_{add,old}=TH_{high}-CNT_{old} \qquad \text{Formula 1}$$

$$CNT_{add,new}=CNT_{add}-CNT_{add,old} \qquad \text{Formula 2}$$

where $TH_{high}$ denotes the upper limit threshold, $TH_{low}$ denotes the lower limit threshold, $CNT_{old}$ denotes the first number, $CNT_{add}$ denotes the second number, $CNT_{add,old}$ denotes the number of storage devices added to the existing group among the second number of storage devices, and $CNT_{add,new}$ denotes the number of storage devices added to the new group among the second number of storage devices.

Assuming that the existing group includes 62 storage devices, and 6 storage devices are newly added, then 62+6=68 (not satisfying the group threshold range). At this moment, 64−62=2 storage devices can be added to the existing group, and 6−2=4 storage devices can be added to the new group. Assuming that the existing group includes 60 storage devices, and 7 storage devices are newly added, then 60+7=67. At this moment, 64−60=4 storage devices can be added to the existing group, and 7−4=3 storage devices can be added to the new group. In the above two examples, since the storage devices in the new group have not yet reached the lower limit threshold, the new group can share one or more storage devices with the existing group.

At block 340, a first portion of storage space in each of a set of shared storage devices selected from the existing group is allocated to the existing group, and a second portion of storage space in each of the set of shared storage devices is allocated to the new group. Here, the set of shared storage devices can be first determined from the existing group. According to an example implementation of the present disclosure, the set of shared storage devices (the number of the set of shared storage devices is denoted as $CNT_{share}$) can be selected based on the second number and the lower limit threshold.

Figure 4:
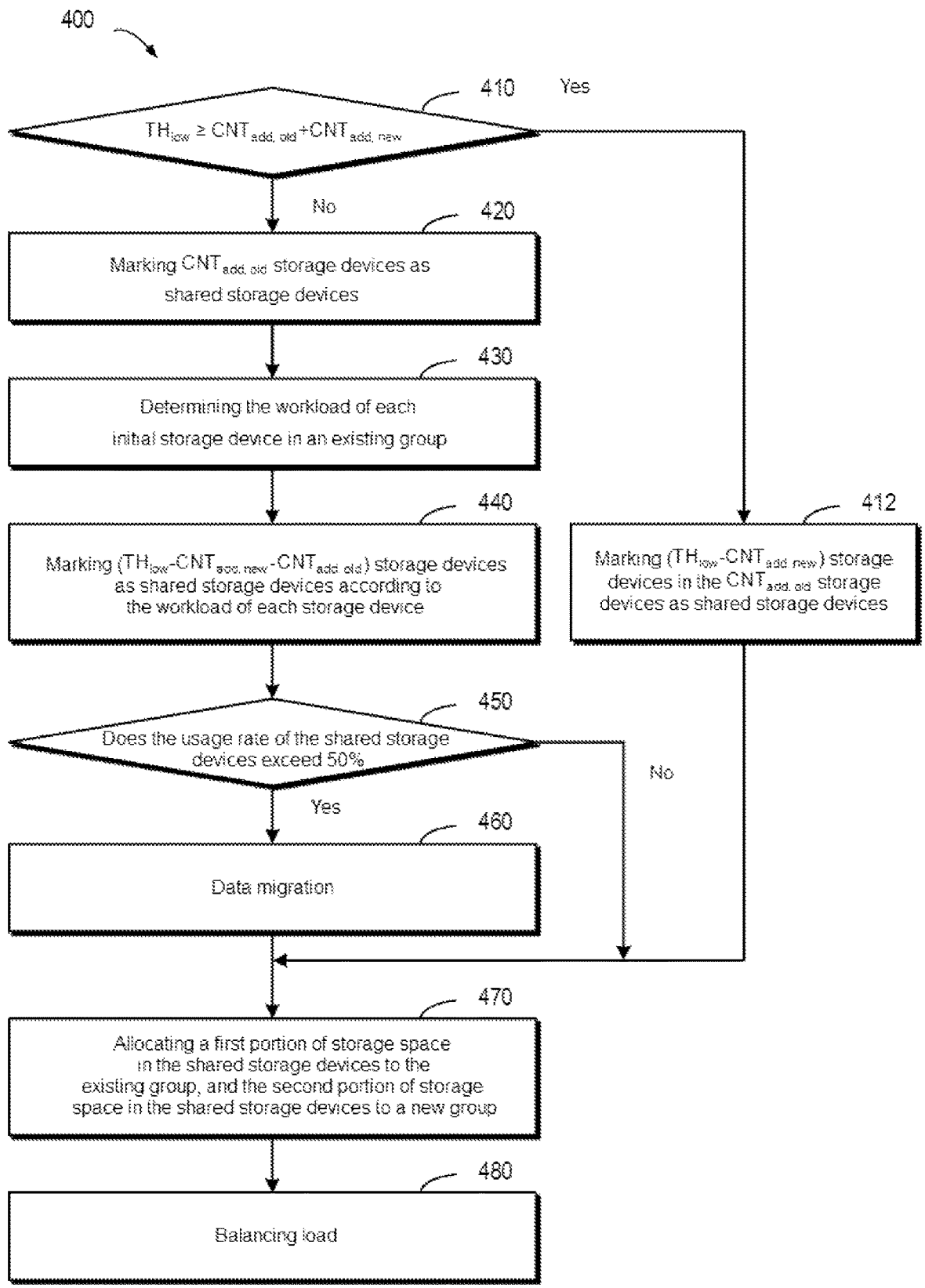
FIG. 4 schematically illustrates a flow chart of a method for determining a set of shared storage devices according to an implementation of the present disclosure.

Hereinafter, how to select a set of shared storage devices will be described in detail with reference to FIG. 4. FIG. 4 schematically illustrates a flow chart of method 400 for determining a set of shared storage devices according to an implementation of the present disclosure. Specifically, at block 410, the second number $CNT_{add}$ ($CNT_{add}=CNT_{add,new}+CNT_{add,old}$) may be compared with the lower limit threshold $TH_{low}$. If the second number is not lower than the lower limit threshold of the group threshold range, it means that the number of the newly added storage devices already satisfies the lower limit threshold. At this moment, method 400 proceeds to block 412, and ($TH_{low}-CNT_{add,new}$) storage devices in the $CNT_{add,old}$ storage devices may be marked as shared storage devices. Specifically, a set of shared storage devices can be selected from another portion of storage devices added to the existing group (that is, $CNT_{add,old}$ storage devices added to the existing group), and the number of the selected shared storage devices is $TH_{low}-CNT_{add,new}$.

It will be understood that the shared storage devices will be used by two groups, which will cause the workloads of the shared storage devices to become high, and therefore, it is necessary to select storage devices with the lowest current workload as the shared storage devices. Since the $CNT_{add,old}$ storage devices newly added to the existing group have not been used yet, when selecting shared storage devices from these storage devices, storage devices with the lowest workload and best performance can be preferentially selected as the shared storage devices. In this way, the problem of high workloads of the shared storage devices can be alleviated, thereby improving the performance of the entire storage system.

In an example, assuming that the existing group includes 60 storage devices and 7 storage devices are newly added, then $CNT_{add,old}=64-60=4$ storage devices can be added to the existing group, and $CNT_{add,new}7-4=3$ storage devices can be added to the new group. At this moment, the second number ($CNT_{add}=7$) is higher than the lower limit threshold ($TH_{low}=6$). Therefore, the shared storage devices can be selected from the 4 newly added storage devices in the existing group. Specifically, the number of the shared storage devices can be determined based on a difference between the lower limit threshold $TH_{low}$ and the number $CNT_{add,new}$ of storage devices in the new group: $TH_{low}-CNT_{add,new}=6-3=3$. In other words, 3 storage devices can be selected from the 4 newly added storage devices in the existing group as the shared storage devices.

According to an example implementation of the present disclosure, if the second number is lower than the lower limit threshold of the group threshold range, this means that the newly added second number of storage devices are not sufficient to construct a group, and one or more storage devices need to be "borrowed" from the initial storage devices in the existing group. In other words, the set of shared storage devices can be selected from the another portion of storage devices added to the existing group and the first number of storage devices. At this moment, the result of determination at block 410 is "No," and method 400 proceeds to block 420. Since the newly added $CNT_{add,old}$ storage devices have not been used yet and have the lowest workload, at block 420, $CNT_{add,old}$ storage devices may be first marked as shared storage devices. In an example, assuming that the existing group includes 60 storage devices and 5 storage devices are newly added, then $CNT_{add,old}=64-60=4$ storage devices can be added to the existing group, and $CNT_{add,new}5-4=1$ storage device can be added to the new group. At this moment, the second number ($CNT_{add}=5$) is lower than the lower limit threshold ($TH_{low}=6$). Therefore, 4 newly added storage devices in the existing group can be selected as shared storage devices.

According to an example implementation of the present disclosure, a target number of shared storage devices in the set of shared storage devices and from the first number of storage devices can be determined based on the first number, the second number, and the group threshold range. The numbers $CNT_{add,old}$ and $CNT_{add,new}$ of storage devices added to the existing group and the new group, respectively, may first be determined according to the method described above. Afterwards, a desired number $CNT_{share}$ of shared storage devices can be determined, and how many shared storage devices to be selected from the first number of storage devices can be determined based on a difference between this desired number and the current number of the set of shared storage devices. According to an example implementation of the present disclosure, how many shared storage devices to be selected from the first number of storage devices can be determined based on $TH_{low}-CNT_{add,new}-CNT_{add,old}$.

Specifically, the desired number of the shared storage devices can be determined based on a difference between the lower limit threshold $TH_{low}$ and the number $CNT_{add,new}$ of storage devices in the new group: $CNT_{share}=TH_{low}-CNT_{add,new}=6-1=5$. In other words, since the new group includes only 1 storage device at this moment, 5 more shared storage devices are needed to reach the lower limit threshold. 4 shared storage devices have already been selected above, so it is necessary to further select 5−4=1 shared storage device from the first number of storage devices in the existing group. In other words, it is necessary to further select 1 storage device from the initial 60 storage devices in the existing group. According to an example implementation of the present disclosure, in order to ensure that the shared storage devices can cope with a relatively high workload, a storage device with the lowest workload can be selected from the initial 60 storage devices in the existing group. According to an example implementation of the present disclosure, at least one storage device satisfying the target number can be selected from the first number of storage devices based on the workload of each of the first number of storage devices.

At this moment, method 400 proceeds to block 430 and determines the workload of each initial storage device in the existing group. The workload of each storage device can be determined based on multiple factors. For example, the state of storage space in the storage device, the distribution of stripes where the extents in the storage device are located, the frequency at which data in the storage device is accessed, the wear degree of the storage device, and the like can be taken into consideration. It will be understood that since the shared storage devices will serve two groups, storage devices with lower workloads can be preferentially selected as the shared storage devices. For example, the workloads of the initial 60 storage devices in the existing group can be ordered, and the group with the lowest workload can be selected as the shared storage devices. At block 440, $TH_{low}$–$CNT_{add,new}$–$CNT_{add,old}$ storage devices can be marked as shared storage devices according to the workload of each storage device.

According to an example implementation of the present disclosure, the storage space in a shared storage device may be divided into two portions, and the two portions of storage space may be allocated to the existing group and the new group, respectively. For example, it can be divided in accordance with a ratio of 1:1 (or some other ratios). If the usage rate of the selected shared storage device exceeds a threshold proportion (e.g., 50%), i.e., the result of determination is "Yes" at block 450, then method 400 proceeds to block 460 to perform data migration. In other words, data in the selected shared storage device may be migrated to another storage device in the first number of storage devices. If the result of determination at block 450 is "No," method 400 directly proceeds to 470.

At block 470, the first portion of storage space in the shared storage device is allocated to the existing group, and the second portion of storage space in the shared storage device is allocated to the new group. It will be understood that at this moment, the idle storage space in the shared storage device will reach 50%, and thus the second portion of storage space for allocation to the new group can be determined from the idle space in the shared storage device, and the first portion of storage space can be determined from storage space other than the second portion of storage space in this storage device. For example, 50% of the idle space can be allocated to the new group, and the remaining storage space can be allocated to the existing group. Address mapping of the corresponding group may be updated based on the allocated storage space. For example, the address mapping of the existing group may be updated based on the first portion of storage space, and the address mapping of the new group may be updated based on the second portion of storage space.

Blocks 410 to 470 in FIG. 4 illustrate the steps of determining one or more shared storage devices and allocating the storage space in the shared storage devices to the existing group and the new group, respectively. At this moment, the existing group and the new group may enter a stable working state. With the operation of the storage system, there may be a difference between the workloads of various storage devices, and thus a load balancing process can be performed at block 480. With the example implementation of the present disclosure, after storage devices have been added to the resource pool, one or more storage devices may be shared between the existing group and the new group if the number of storage devices in the resource pool does not satisfy the group threshold range. In this way, the storage space in the newly added storage devices can be utilized as much as possible.

Figure 5:
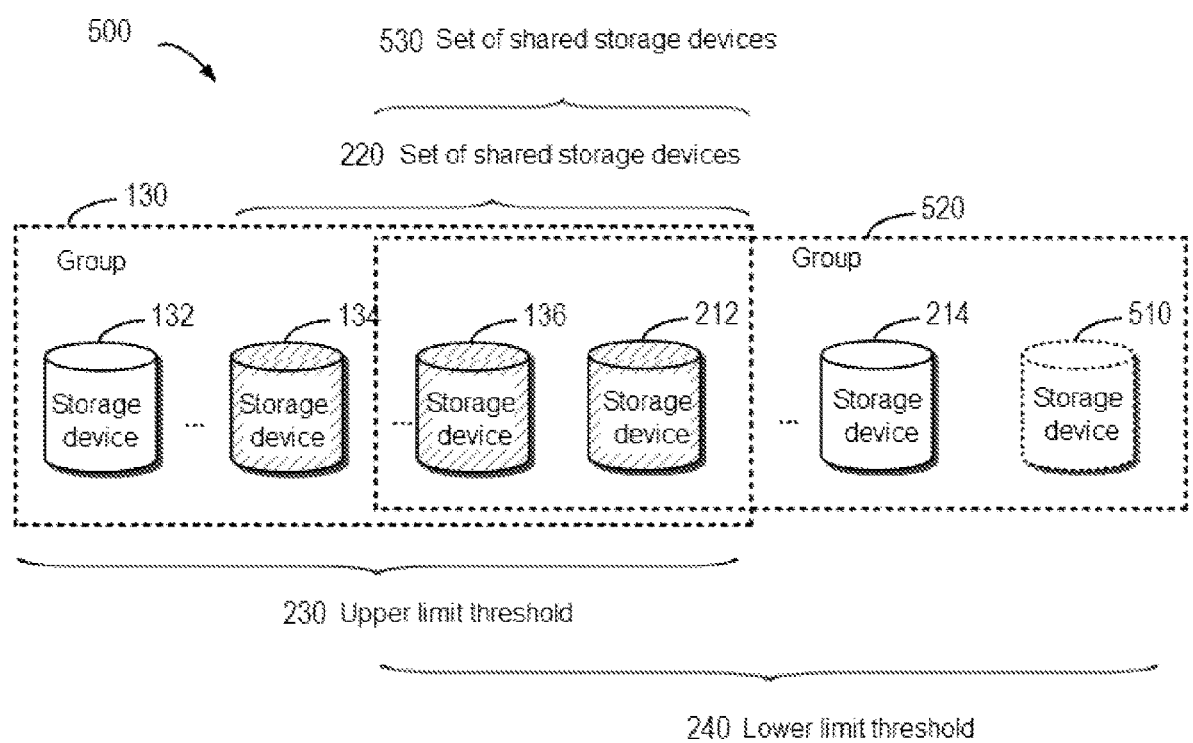
FIG. 5 schematically illustrates a block diagram of a process for adding more storage devices to a resource pool according to an implementation of the present disclosure.

With the operation of the storage system, storage devices can be continuously added to the resource pool, so the number of storage devices in the resource pool will change. At this moment, a portion or all of the shared storage devices can be released, that is, data in a portion or all of the shared storage devices can be migrated to the newly added storage devices. Hereinafter, the case of adding storage devices again will be described with reference to FIG. 5. FIG. 5 schematically illustrates a block diagram of process 500 for adding more storage devices to a resource pool according to an implementation of the present disclosure. Storage devices 134, . . . , 136, and 212 shown in shading in FIG. 5 represent a set of shared storage devices 220 before the further addition. Storage device 510 can be added to the resource pool. At this moment, storage device 510 can be added to the new group to form new group 520, and one shared storage device (for example, storage device 134) can be released.

Specifically, data in the second portion of storage space in storage device 134 can be migrated to storage device 510, and all the storage space in storage device 134 can be allocated to existing group 130. At this moment, a set of shared storage devices 530 may include storage devices 136, 212, etc., and the numbers of storage devices in groups 130 and 520 both satisfy upper limit threshold 230 and lower limit threshold 240.

According to an example implementation of the present disclosure, the third number can be compared with a difference between the upper limit threshold and the number of storage devices in the new group. If it is determined that the third number (denoted as $CNT_{add2}$) is higher than the difference, only a portion of the third number of storage devices can be added to the new group based on the upper limit threshold. At this moment, all the shared storage devices can be released, and a new group can be created based on the remaining storage devices. If the number of the remaining storage devices satisfies the group threshold range, a new group can be created in accordance with conventional technical solutions. If the number of the remaining storage devices does not satisfy the group threshold range, a new group can be created in accordance with method 300 described above.

According to an example implementation of the present disclosure, a difference between the upper limit threshold and the number of storage devices in the new group may be determined, and the third number may be compared with this difference. If the third number is not higher than the difference, the third number of storage devices can be added to the new group, and at this moment the number of storage devices in the new group will not exceed the upper limit threshold.

According to an example implementation of the present disclosure, subsequent steps can be determined based on whether the current set of shared storage devices is empty. If the set of shared storage devices is empty (i.e., there are no shared storage devices at this moment), the processing can be performed in accordance with solutions in the prior art or method 300 described above. If the set of shared storage devices is non-empty (i.e., there are one or more shared storage devices), the number of the set of shared storage devices can be compared with the third number, so as to migrate data in at least a portion of shared storage devices in the set of shared storage devices to the third number of storage devices. If the number of the set of shared storage devices is higher than the third number, only the third number of storage devices can be used to replace a portion of shared storage devices. If the number of the set of shared storage devices is not higher than the third number, the third number of storage devices can be used to replace all of the shared storage devices.

Figure 6:
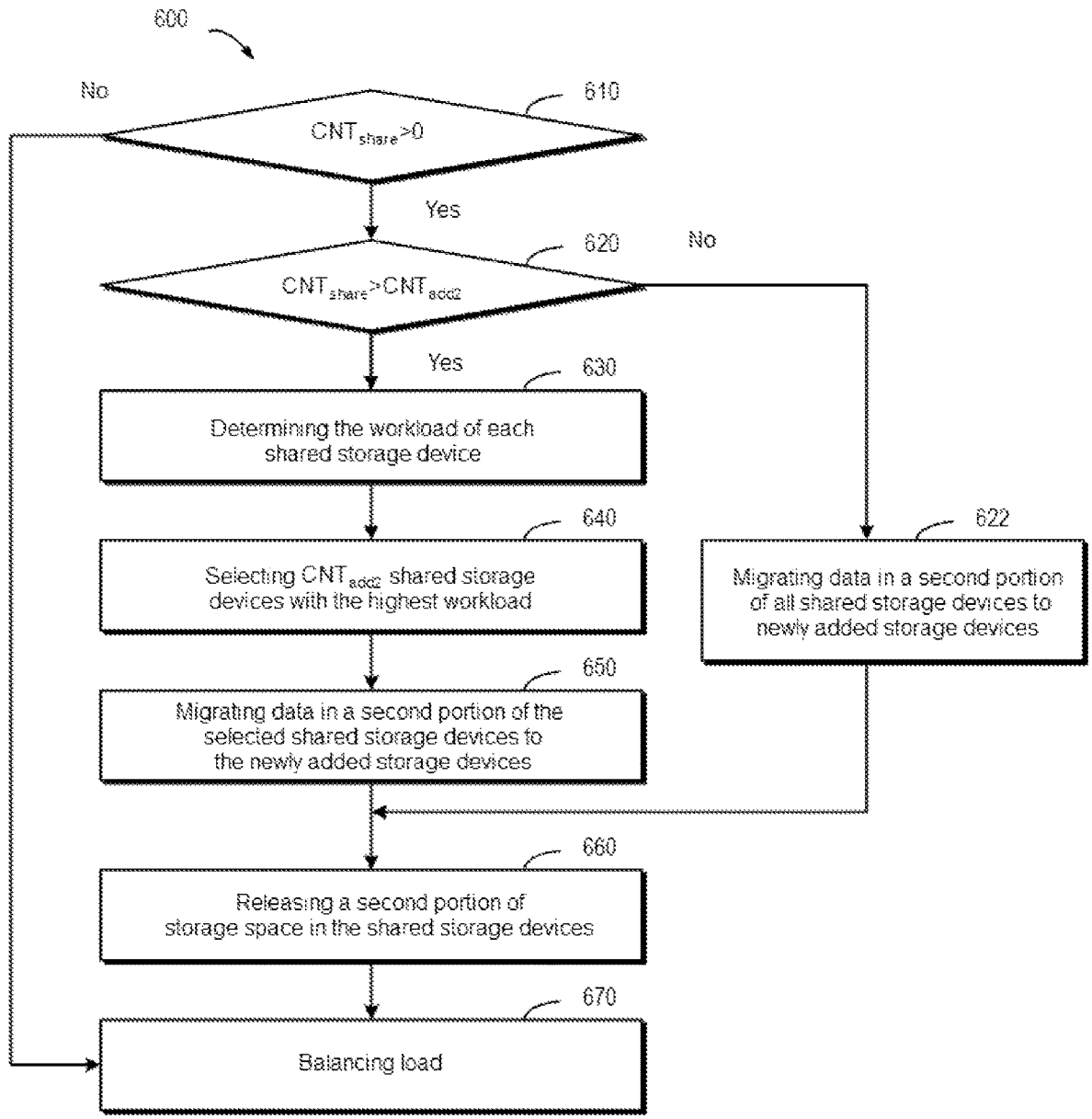
FIG. 6 schematically illustrates a flow chart of a method for releasing shared storage devices according to an implementation of the present disclosure.

Hereinafter, more details about releasing shared storage devices will be described with reference to FIG. 6. FIG. 6 schematically illustrates a flow chart of method 600 for releasing shared storage devices according to an implementation of the present disclosure. If the result of determination at block 610 is no, it means that there is no shared storage device. At this moment, the groups are all in a stable working state, and method 600 directly proceeds to block 670. If the result of determination at block 610 is yes, method 600 proceeds to block 620 to compare the number $CNT_{share}$ of the set of shared storage devices with the third number $CNT_{add2}$ of the newly added storage devices.

At block 620, if the result of determination is no, it means that all of the shared storage devices can be released. In other words, the data in the "borrowed" portion of all the shared storage devices can be migrated to the newly added storage devices in the new group. Method 600 proceeds to block 622 to migrate the data in the second portion of all the shared storage devices to the newly added storage devices. Specifically, at least one storage device may be selected from the third number of storage devices, wherein the number of the at least one storage device is equal to the number of the set of shared storage devices. Assuming that the current set of storage devices includes 5 storage devices, and 6 storage devices are added to the new group. Any 5 storage devices can be selected from the 6 storage devices as the migration destination. Further, the data in the second portion of the 5 shared storage devices can be migrated to the selected 5 storage devices, respectively.

At block 620, if the result of determination is yes, it means that only a portion of the shared storage devices can be released. At this moment, method 600 proceeds to block 630 to select a subset of shared storage devices from the set of shared storage devices. It will be understood that, since the shared storage devices have high workloads, in order to avoid bottlenecks caused by excessive workloads, one or more shared storage devices with the highest workloads can be preferentially released. At block 630, the workload of each shared storage device may be determined.

Figure 7:
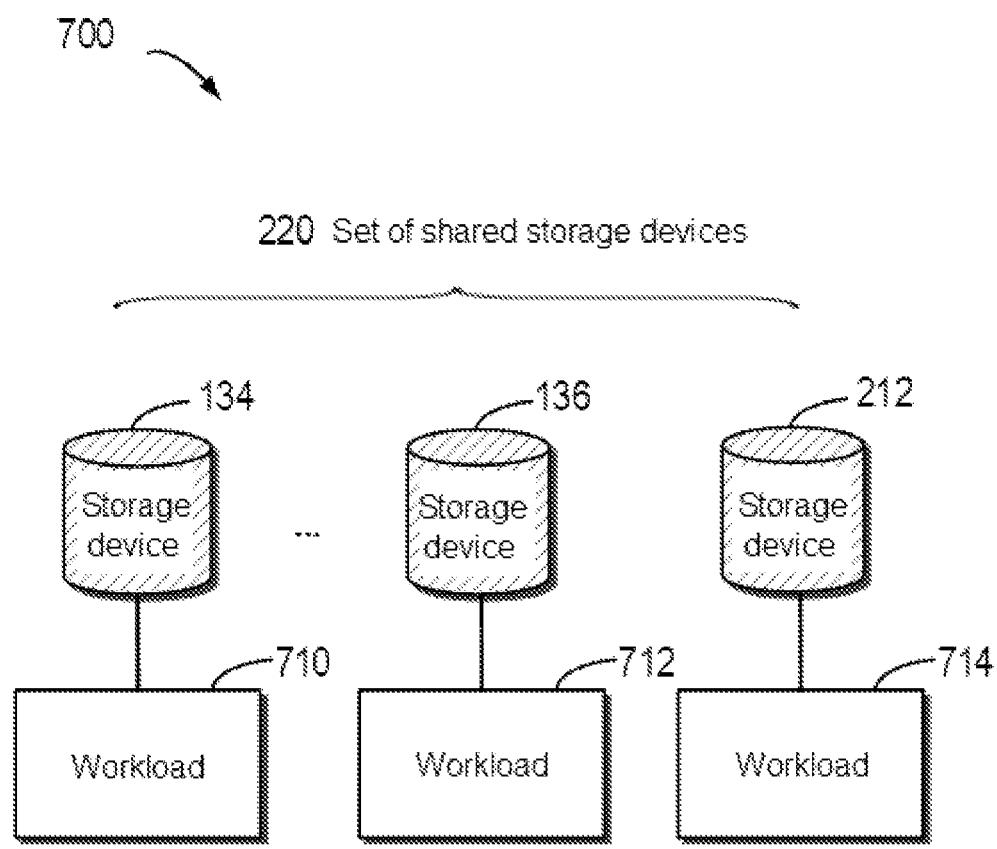
FIG. 7 schematically illustrates a block diagram of a process for selecting, from a set of shared storage devices, shared storage devices to be released, according to an implementation of the present disclosure.

Hereinafter, the process of determining shared storage devices to be released will be described with reference to FIG. 7. FIG. 7 schematically illustrates a block diagram of process 700 for selecting, from a set of shared storage devices, shared storage devices to be released according to an implementation of the present disclosure. As shown in FIG. 7, for each of storage devices 134, . . . , 136, and 212 in the set of shared storage devices 220, a corresponding workload 710, . . . 712, and 714 can be determined. Workloads can be determined here based on the aspects described above to find the storage devices with the highest workload. Assuming that workload 710 is higher than the workloads of other storage devices, data in storage device 134 may be selected to be migrated.

According to an example implementation of the present disclosure, $CNT_{add2}$ storage devices may be selected to be released. Returning to FIG. 6, at block 640, $CNT_{add2}$ shared storage devices with the highest workload can be selected. At this moment, the number of shared storage devices in the selected subset is equal to $CNT_{add2}$. Continuing with the example above. Assuming that the existing group includes 60 storage devices and 5 storage devices are newly added at the first time, then $CNT_{add,old}$=64−60=4 storage devices are added to the existing group, and $CNT_{add,new}$5−4=1 storage device is added to the new group. At this moment, the set of shared storage devices includes 5 storage devices (wherein 4 storage devices are newly-added storage devices, and 1 storage device is one of the initial 60 storage devices). Assuming that 4 storage devices are newly added at the second time, the number 4 of the newly added storage devices is less than the number 5 of the set of shared storage devices, and at this moment, 4 storage devices can be selected from the set of storage devices as the subset.

According to an example implementation of the present disclosure, the workload of each of the set of shared storage devices can be determined, and the subset can be selected from the set of shared storage devices in accordance with the workload. The storage device with the highest workload can be selected preferentially for data migration. Continuing with the example above. The current set of shared storage devices includes 5 storage devices, wherein 1 storage device comes from the initial 60 storage devices in the existing group. Since this storage device has a long use time and contains more data, it can be preferentially added to the subset. Further, 3 storage devices with high workloads can be selected from the remaining 4 storage devices in the set of shared storage devices, so as to be added to the subset.

Figure 8:
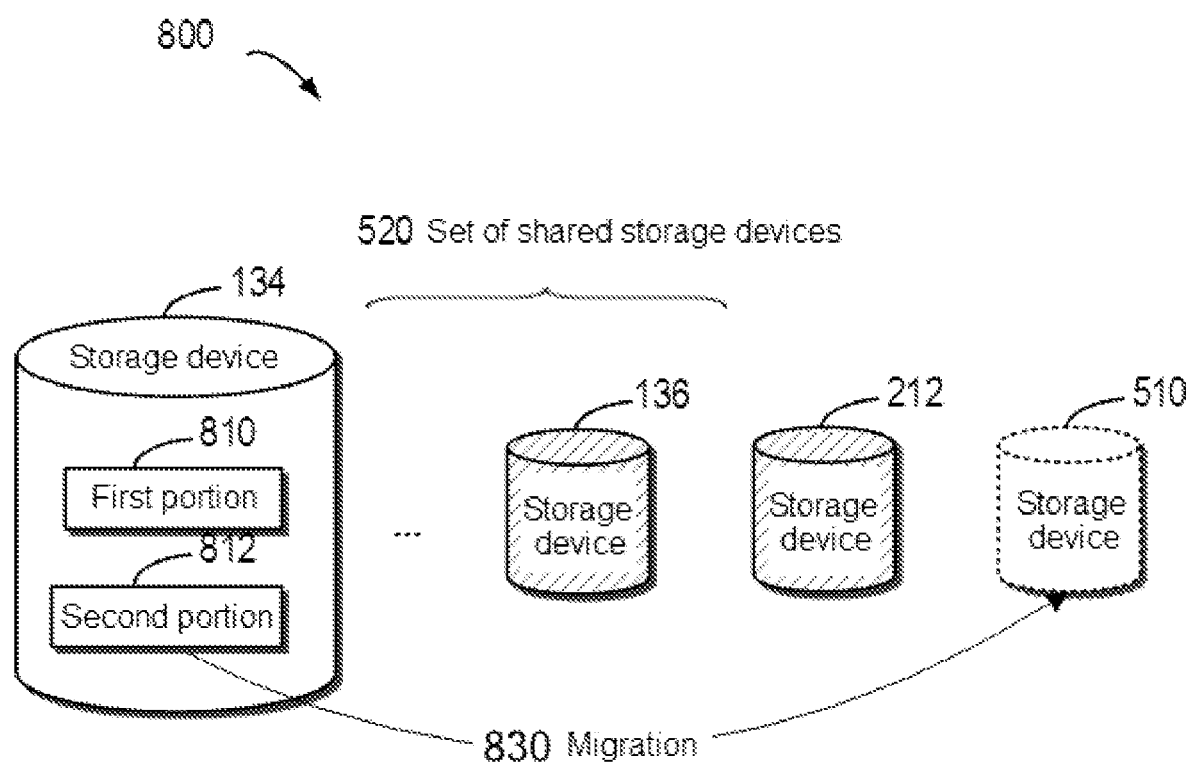
FIG. 8 schematically illustrates a block diagram of a process for migrating data from a to-be-released shared storage device according to an implementation of the present disclosure.

At block 650, data in the second portion in the selected shared storage devices may be migrated to the newly added storage devices. Hereinafter, more details about the migration will be described with reference to FIG. 8. FIG. 8 schematically illustrates a block diagram of process 800 for migrating data from a to-be-released shared storage device according to an implementation of the present disclosure. As shown in FIG. 8, storage device 134 to be released may include first portion 810 and second portion 812, wherein first portion 810 is allocated to the existing group, and second portion 812 is allocated to the new group. The data in second portion 812 can be migrated to the newly added storage device 510. Specifically, data in the second portion of each shared storage device in the selected subset can be migrated to the third number of storage devices. In other words, the data in the storage space of the 4 shared storage devices that is allocated to the new group can be migrated to the newly added 4 storage devices, respectively.

It will be understood that, here, only the data in the second portion in the shared storage devices (that is, the storage space allocated to the new group) is migrated. The first portion of the storage space still belongs to the existing group. After the data migration has been completed, all the storage space in the shared storage devices will belong to the existing group. At this moment, the address mapping of the group can be updated so that the group includes all the storage space of each shared storage device in the subset. Further, the shared storage devices in the subset may be removed from the set of shared storage devices. Each shared storage device that has completed data migration can be removed one by one from the set of shared storage devices. After data migration from the 4 shared storage devices has completed, the set of shared storage devices only includes 5−4=1 shared storage device. After the migration, the data in the second portion is no longer useful. Therefore, as shown in block 660 of FIG. 6, the second portion of storage space in the storage device can be released. At this moment, all the storage space in storage device 134 will belong to the existing group.

The process of releasing shared storage devices has been described in detail above. In the releasing process, the data in the storage space in the shared storage devices that is allocated to the new group can be migrated to the newly added storage devices in the new group. In this way, each storage device in the existing group will gradually recover to the state of only serving one group.

At block 670, a load balancing process may be performed. In other words, if it is found that the workloads of the storage devices in a certain group are unbalanced, the load balancing process can be performed across multiple storage devices in the group. For example, the load balancing process can be performed in the existing group, the load balancing process can be performed in the new group, or the load balancing process can be performed in both the existing group and the new group. The load balancing process here may involve many factors, for example, the usage rate of the storage space in the storage device, the frequency with which the data in the storage device is accessed, the wear degree of the storage device, and the like, can be balanced. In this way, the workloads of the storage devices can be balanced, thus improving the performance and response speed of the storage system.

Examples of the method according to the present disclosure have been described in detail above with reference to FIGS. 2 to 8, and implementations of a corresponding apparatus will be described below. According to an example implementation of the present disclosure, an apparatus for managing a resource pool of a storage system is provided. Here, the resource pool includes multiple storage devices which are divided into at least one group with a first number of storage devices in an existing group of the at least one group not higher than an upper limit threshold of a group threshold range. The apparatus includes: a determining module configured to determine, according to a determination that a second number of storage devices are added to the resource pool, a sum of the first number and the second number; a creating module configured to create a new group based on at least a portion of the second number of storage devices according to a determination that the sum of the first number and the second number does not satisfy the group threshold range; an adding module configured to add another portion of the second number of storage devices to the existing group; and an allocating module configured to allocate a first portion of storage space in each of a set of shared storage devices selected from the existing group to the existing group, and a second portion of storage space in each of the set of shared storage devices to the new group. According to an example implementation of the present disclosure, this apparatus further includes modules for performing other steps in the method described above.

Figure 9:
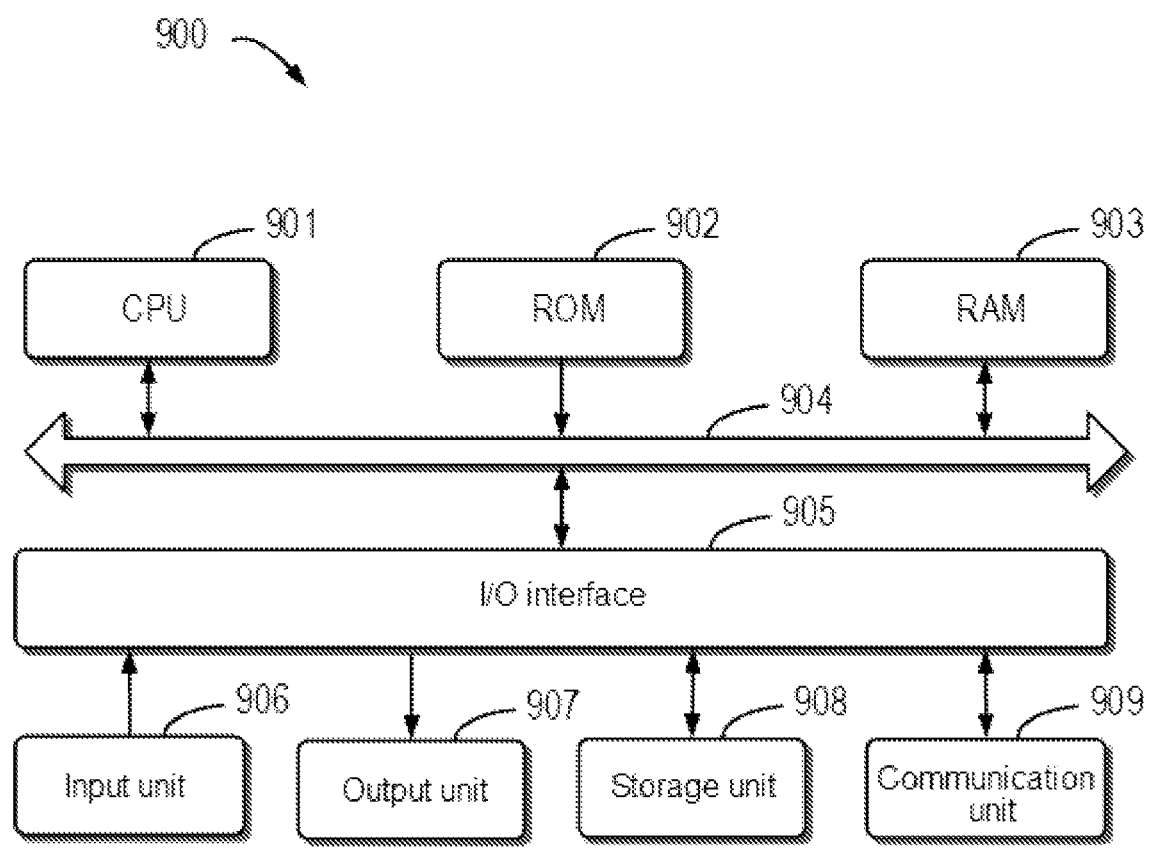
FIG. 9 schematically illustrates a block diagram of a device for managing a resource pool of a storage system according to an example implementation of the present disclosure.

FIG. 9 schematically illustrates a block diagram of device 900 for managing a resource pool of a storage system according to an example implementation of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 into random access memory (RAM) 903. Various programs and data required by the operation of device 900 may also be stored in RAM 903. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, some or all of the computer program may be loaded and/or installed onto device 900 via ROM 902 and/or communication unit 909. One or more steps of method 300 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, an electronic device is provided, including: at least one processor; and a memory coupled to the at least one processor, wherein the memory has instructions stored therein which, when executed by the at least one processor, cause the device to perform a method for managing a resource pool. The resource pool includes multiple storage devices which are divided into at least one group with a first number of storage devices in an existing group of the at least one group not higher than an upper limit threshold of a group threshold range, and this method includes: determining, according to a determination that a second number of storage devices are added to the resource pool, a sum of the first number and the second number; creating a new group based on at least a portion of the second number of storage devices according to a determination that the sum of the first number and the second number does not satisfy the group threshold range; adding another portion of the second number of storage devices to the existing group; and allocating a first portion of storage space in each of a set of shared storage devices selected from the existing group to the existing group, and a second portion of storage space in each of the set of shared storage devices to the new group.

According to an example implementation of the present disclosure, allocating the first portion of storage space to the existing group includes updating address mapping of the existing group based on the first portion of storage space; and allocating the second portion of storage space to the new group includes updating address mapping of the new group based on the second portion of storage space.

According to an example implementation of the present disclosure, the method further includes: selecting the set of shared storage devices based on the second number and the lower limit threshold.

According to an example implementation of the present disclosure, selecting the set of shared storage devices includes: selecting the set of shared storage devices from the another portion of storage devices added to the existing group according to a determination that the second number is not lower than a lower limit threshold of the group threshold range.

According to an example implementation of the present disclosure, selecting the set of shared storage devices includes: selecting the set of shared storage devices from the another portion of storage devices added to the existing group and the first number of storage devices according to a determination that the second number is lower than a lower limit threshold of the group threshold range.

According to an example implementation of the present disclosure, selecting the set of shared storage devices from the first number of storage devices includes: determining a target number of shared storage devices in the set of shared storage devices that are from the first number of storage devices based on the second number and the group threshold range; and selecting at least one storage device satisfying the target number from the first number of storage devices based on a workload of each of the first number of storage devices.

According to an example implementation of the present disclosure, selecting the at least one storage device satisfying the target number includes: migrating data in the selected at least one storage device to another storage device in the first number of storage devices according to a determination that idle storage space of the selected at least one storage device is in a proportion less than a threshold proportion.

According to an example implementation of the present disclosure, the method further includes: for a given shared storage device in the set of shared storage devices, determining the second portion of storage space from idle storage space of the given shared storage device; and determining the first portion of storage space from a storage space other than the second portion of storage space in the given shared storage device.

According to an example implementation of the present disclosure, the method further includes: comparing, according to a determination that a third number of storage devices are added to the resource pool, the third number with a difference between the upper limit threshold and the number of storage devices in the new group; adding the third number of storage devices to the new group according to a determination that the third number is not higher than the difference; and migrating data in at least a portion of shared storage devices in the set of shared storage devices to the third number of storage devices according to a determination that the set of shared storage devices is non-empty.

According to an example implementation of the present disclosure, migrating the data in the at least a portion of shared storage devices to the third number of storage devices includes: selecting at least one storage device from the third number of storage devices according to a determination that the number of the set of shared storage devices is not higher than the third number, wherein the number of the at least one storage device is equal to the number of the set of shared storage devices; and migrating data in the second portion of each of the set of shared storage devices to the selected at least one storage device, respectively.

According to an example implementation of the present disclosure, the method further includes: updating address mapping of the existing group so that the existing group includes all storage space of each of the set of shared storage devices.

According to an example implementation of the present disclosure, migrating the data in the at least a portion of shared storage devices to the third number of storage devices includes: selecting a subset of shared storage devices from the set of shared storage devices according to a determination that the number of the set of shared storage devices is higher than the third number, wherein the number of shared storage devices in the selected subset is equal to the third number; migrating data in a second portion of each shared storage device in the selected subset to the third number of storage devices; and removing the shared storage devices in the subset from the set of shared storage devices.

According to an example implementation of the present disclosure, the method further includes: updating address mapping of the existing group so that the existing group includes all storage space of each shared storage device in the subset.

According to an example implementation of the present disclosure, selecting the subset from the set of shared storage devices includes: selecting the subset from the set of shared storage devices according to a workload of each of the set of shared storage devices.

According to an example implementation of the present disclosure, the method further includes: comparing, according to a determination that a third number of storage devices are added to the resource pool, the third number with a difference between the upper limit threshold and the number of storage devices in the new group; and adding a portion of the third number of storage devices to the new group based on the upper limit threshold according to a determination that the third number is higher than the difference.

According to an example implementation of the present disclosure, the method further includes: performing load balancing for data in storage devices in either of the existing group and the new group.

According to an example implementation of the present disclosure, the upper limit threshold and the lower limit threshold of the group threshold range respectively define an upper limit and a lower limit of the number of storage devices in each group of the at least one group, and the lower limit threshold is determined based on a stripe width of the storage system and the number of backup storage devices.

According to an example implementation of the present disclosure, the number of storage devices in each group other than the existing group of the at least one group is equal to the upper limit threshold, respectively.

According to an example implementation of the present disclosure, a computer program product is provided, which is tangibly stored on a non-transitory computer-readable medium and includes machine-executable instructions, wherein the machine-executable instructions are used for performing the method according to the present disclosure.

According to an example implementation of the present disclosure, a computer-readable medium is provided. The computer-readable medium stores machine-executable instructions which, when executed by at least one processor, cause the at least one processor to implement the method according to the present disclosure.

The present disclosure may be a method, a device, a system, and/or a computer program product. The computer program product may include a computer-readable storage medium, on which computer-readable program instructions used for executing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device (for example, a punch card or a raised structure in a groove with instructions stored thereon), and any suitable combination of the foregoing. The computer-readable storage medium used herein is not to be interpreted as transient signals per se, such as radio waves or other freely propagating electromagnetic waves, electromagnetic waves propagated through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The computer-readable program instructions are received by a network adapter card or network interface of each computing/processing device from the network, and are forwarded thereby to be stored in the computer-readable storage medium of each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be completely executed on a user's computer, partially executed on a user's computer, executed as an independent software package, partially executed on a user's computer and partially executed on a remote computer, or completely executed on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow chart and/or block diagrams and combinations of blocks in the flow charts and/or block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. The computer-readable program instructions may also be stored in the computer-readable storage medium, and the instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flow charts and/or block diagrams.

The computer-readable program instructions may also be loaded onto computers, other programmable data processing apparatuses, or other devices, so that a series of operating steps may be executed on the computers, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should also be noted that each block in the block diagrams and/or flow charts and a combination of blocks in the block diagrams and/or flow charts may be implemented by a dedicated hardware-based system for executing specified functions or actions, or may be implemented by a combination of dedicated hardware and computer instructions.

Various implementations of the present disclosure have been described above. The above description is illustrative and not exhaustive, and is not limited to the various implementations disclosed. Many modifications and variations will be apparent to those of ordinary skill in the art without departing from the scope and spirit of the illustrated various implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing a resource pool of a storage system, the resource pool including multiple storage devices which are divided into at least one group with a first number of storage devices in an existing group of the at least one group not higher than an upper limit threshold of a group threshold range, wherein the method includes:
   determining, according to a determination that a second number of storage devices are added to the resource pool, a sum of the first number and the second number;
   creating a new group based on at least a portion of the second number of storage devices according to a determination that the sum of the first number and the second number does not satisfy the group threshold range;
   adding another portion of the second number of storage devices to the existing group; and
   allocating a first portion of storage space in each of a set of shared storage devices selected from the existing group to the existing group, and a second portion of storage space in each of the set of shared storage devices to the new group, wherein the allocating is effective to organize the storage devices such that:
each storage device of the set of shared storage devices is a member of the existing group and is also a member of the new group;
the number of storage devices of the existing group including the shared storage devices is equal to the upper limit threshold; and
the number of storage devices of the new group including the shared storage devices is at least a lower limit threshold of the group threshold range.

2. The method according to claim 1, wherein
allocating the first portion of storage space to the existing group includes: updating address mapping of the existing group based on the first portion of storage space; and
allocating the second portion of storage space to the new group includes: updating address mapping of the new group based on the second portion of storage space.

3. The method according to claim 1, further including: selecting the set of shared storage devices based on the second number and the lower limit threshold of the group threshold range.

4. The method according to claim 3, wherein selecting the set of shared storage devices includes:
selecting, according to a determination that the second number is not lower than the lower limit threshold of the group threshold range, the set of shared storage devices from the another portion of storage devices added to the existing group.

5. The method according to claim 3, wherein selecting the set of shared storage devices includes:
selecting, according to a determination that the second number is lower than the lower limit threshold of the group threshold range, the set of shared storage devices from the another portion of storage devices added to the existing group and the first number of storage devices.

6. The method according to claim 5, wherein selecting the set of shared storage devices from the first number of storage devices includes:
determining, based on the second number and the group threshold range, a target number of shared storage devices in the set of shared storage devices and from the first number of storage devices; and
selecting, based on a workload of each of the first number of storage devices, at least one storage device satisfying the target number from the first number of storage devices.

7. The method according to claim 6, wherein selecting the at least one storage device satisfying the target number includes: migrating data in the selected at least one storage device to another storage device in the first number of storage devices according to a determination that idle storage space of the selected at least one storage device is in a proportion less than a threshold proportion.

8. The method according to claim 7, further including: for a given shared storage device in the set of shared storage devices,
determining the second portion of storage space from idle storage space of the given shared storage device; and
determining the first portion of storage space from a storage space other than the second portion of storage space in the given shared storage device.

9. The method according to claim 1, further including:
comparing, according to a determination that a third number of storage devices are added to the resource pool, the third number with a difference between the upper limit threshold and the number of storage devices in the new group;
adding the third number of storage devices to the new group according to a determination that the third number is not higher than the difference; and
migrating data in at least a portion of shared storage devices in the set of shared storage devices to the third number of storage devices according to a determination that the set of shared storage devices is non-empty.

10. The method according to claim 9, wherein migrating the data in the at least a portion of shared storage devices to the third number of storage devices includes:
selecting at least one storage device from the third number of storage devices according to a determination that the number of the set of shared storage devices is not higher than the third number, wherein the number of the at least one storage device is equal to the number of the set of shared storage devices; and
migrating data in the second portion of each of the set of shared storage devices to the selected at least one storage device, respectively.

11. The method according to claim 10, further including: updating address mapping of the existing group so that the existing group includes all storage space of each of the set of shared storage devices.

12. The method according to claim 9, wherein migrating the data in the at least a portion of shared storage devices to the third number of storage devices includes:
selecting a subset of shared storage devices from the set of shared storage devices according to a determination that the number of the set of shared storage devices is higher than the third number, wherein the number of shared storage devices in the selected subset is equal to the third number;
migrating data in a second portion of each shared storage device in the selected subset to the third number of storage devices; and
removing the shared storage devices in the subset from the set of shared storage devices.

13. The method according to claim 12, further including: updating address mapping of the existing group so that the existing group includes all storage space of each shared storage device in the subset.

14. The method according to claim 9, wherein selecting the subset from the set of shared storage devices includes: selecting the subset from the set of shared storage devices according to a workload of each of the set of shared storage devices.

15. The method according to claim 1, further including:
comparing, according to a determination that a third number of storage devices are added to the resource pool, the third number with a difference between the upper limit threshold and the number of storage devices in the new group; and
adding a portion of the third number of storage devices to the new group based on the upper limit threshold and according to a determination that the third number is higher than the difference.

16. The method according to claim 1, further including: performing load balancing for data in storage devices in either of the existing group and the new group.

17. The method according to claim 1, wherein the upper limit threshold and the lower limit threshold of the group threshold range respectively define an upper limit and a lower limit of the number of storage devices in each group of the at least one group, and the lower limit threshold is determined based on a stripe width of the storage system and the number of backup storage devices.

18. The method according to claim 17, wherein the number of storage devices in each group other than the existing group of the at least one group is equal to the upper limit threshold, respectively.

19. An electronic device, the device including:

at least one processor; and a memory coupled to the at least one processor, wherein the memory has instructions stored therein which, when executed by the at least one processor, cause the device to perform a method for managing a resource pool of a storage system, the resource pool including multiple storage devices which are divided into at least one group with a first number of storage devices in an existing group of the at least one group not higher than an upper limit threshold of a group threshold range, wherein the method includes:

determining, according to a determination that a second number of storage devices are added to the resource pool, a sum of the first number and the second number;

creating a new group based on at least a portion of the second number of storage devices according to a determination that the sum of the first number and the second number does not satisfy the group threshold range;

adding another portion of the second number of storage devices to the existing group; and allocating a first portion of storage space in each of a set of shared storage devices selected from the existing group to the existing group, and a second portion of storage space in each of the set of shared storage devices to the new group, wherein the allocating is effective to organize the storage devices such that:

each storage device of the set of shared storage devices is a member of the existing group and is also a member of the new group;

the number of storage devices of the existing group including the shared storage devices is equal to the upper limit threshold; and the number of storage devices of the new group including the shared storage devices is at least a lower limit threshold of the group threshold range.

20. A computer program product having a non-transitory computer readable medium which stores a set of instructions to manage a resource pool of a storage system, the resource pool including multiple storage devices which are divided into at least one group with a first number of storage devices in an existing group of the at least one group not higher than an upper limit threshold of a group threshold range; the set of instructions, when carried out by computerized circuitry, causing the computerized circuitry to perform a method of:

determining, according to a determination that a second number of storage devices are added to the resource pool, a sum of the first number and the second number;

creating a new group based on at least a portion of the second number of storage devices according to a determination that the sum of the first number and the second number does not satisfy the group threshold range;

adding another portion of the second number of storage devices to the existing group; and allocating a first portion of storage space in each of a set of shared storage devices selected from the existing group to the existing group, and a second portion of storage space in each of the set of shared storage devices to the new group, wherein the allocating is effective to organize the storage devices such that:

each storage device of the set of shared storage devices is a member of the existing group and is also a member of the new group;

the number of storage devices of the existing group including the shared storage devices is equal to the upper limit threshold; and the number of storage devices of the new group including the shared storage devices is at least a lower limit threshold of the group threshold range.

\* \* \* \* \*